United States Patent
Chac et al.

(10) Patent No.: US 11,794,226 B2
(45) Date of Patent: Oct. 24, 2023

(54) SURFACE CLEANING MECHANISMS AND METHODS

(71) Applicant: Dynamic Water Technologies Global, LLC, Scottsdale, DE (US)

(72) Inventors: George Tuan Long Chac, Mesa, AZ (US); Melvin Mathew, Tempe, AZ (US); Michael Christopher Boyko, Gilbert, AZ (US); Henry Mohrschladt, Scottsdale, AZ (US); Steve Devoll, East Littlerock, CA (US)

(73) Assignee: Dynamic Water Technologies Global, L.L.C., Scottsdale, AZ (US)

( * ) Notice: Subject to any disclaimer, the term of this patent is extended or adjusted under 35 U.S.C. 154(b) by 603 days.

(21) Appl. No.: 17/095,036

(22) Filed: Nov. 11, 2020

(65) Prior Publication Data
US 2022/0143658 A1 May 12, 2022

(51) Int. Cl.
*B08B 9/08* (2006.01)
*C02F 1/461* (2023.01)
(Continued)

(52) U.S. Cl.
CPC .......... *B08B 9/0856* (2013.01); *B08B 1/005* (2013.01); *C02F 1/004* (2013.01);
(Continued)

(58) Field of Classification Search
CPC ....... B08B 9/0856; B08B 9/808; B08B 9/087; B08B 1/005; C02F 1/004; C02F 1/46109;
(Continued)

(56) References Cited

U.S. PATENT DOCUMENTS

| | | | | |
|---|---|---|---|---|
| 329,034 A | * | 10/1885 | Fitzsimons | E03F 9/002 |
| | | | | 15/104.31 |
| 735,846 A | * | 8/1903 | Vogt | F41A 29/02 |
| | | | | 15/104.19 |

(Continued)

FOREIGN PATENT DOCUMENTS

| CN | 202508932 U | 4/2012 |
|---|---|---|
| CN | 110563097 A | 9/2019 |
| CN | 211570203 U | 1/2020 |

OTHER PUBLICATIONS

Feb. 7, 2022 PCT International Search Report and Written Opinion of the International Searching Authority for Application No. PCT/IB21/60410.

*Primary Examiner* — Don M Anderson
*Assistant Examiner* — Jason Khalil Hawkins
(74) *Attorney, Agent, or Firm* — Law Offices of Damon L. Boyd, PLLC

(57) ABSTRACT

The present disclosure comprises devices, systems and methods for the removal of a precipitate from a surface of a water treatment chamber using a dasher assembly having two cylindrical actuator rods connected to a dasher for scraping an interior surface of the water treatment chamber. The water treatment chamber has an enclosed first end, an enclosed second end, and an electrolysis rod extending linearly therein. The two cylindrical actuator rods extend linearly within the water treatment chamber and pass through the enclosed first end so that portions of the two cylindrical actuator rods are within the water treatment chamber and portions are outside the water treatment chamber. The dasher includes an aperture therethrough so the electrolysis rod can pass through the aperture and allow the dasher to translate from a first location and a second location by translation of the two cylindrical actuator rods via a mechanical actuator. The dasher may include teeth extend- (Continued)

ing from an outer edge of the dasher to score the precipitate as it translates from the first location to the second location. The dasher assembly is controlled manually and/or by an automated control system.

20 Claims, 6 Drawing Sheets

(51) Int. Cl.
*C02F 1/00* (2023.01)
*B08B 1/00* (2006.01)

(52) U.S. Cl.
CPC ............ *C02F 1/46109* (2013.01); *C02F 2001/46171* (2013.01); *C02F 2201/46105* (2013.01); *C02F 2303/22* (2013.01)

(58) Field of Classification Search
CPC ............ C02F 1/4602; C02F 1/46104; C02F 2001/46171; C02F 2001/46119; C02F 2201/46105; C02F 2303/22; E03C 1/302
USPC ............ 15/93.1, 104.16, 104.03, 104.05
See application file for complete search history.

(56) References Cited

U.S. PATENT DOCUMENTS

| | | | | |
|---|---|---|---|---|
| 1,758,995 | A | * | 5/1930 | Armstrong .......... E21B 17/1071 |
| | | | | 15/104.16 |
| 3,259,179 | A | | 7/1966 | Leach |
| 3,869,747 | A | | 3/1975 | Richter |
| 5,311,929 | A | | 5/1994 | Verret |
| 6,408,936 | B2 | * | 6/2002 | Duran ....................... F28G 1/08 |
| | | | | 165/95 |
| 9,146,063 | B2 | | 9/2015 | Meurville et al. |

* cited by examiner

SURFACE CLEANING MECHANISMS AND METHODS

FIELD OF THE INVENTION

The invention relates to the removal of precipitates from fluid treatment component surfaces.

BACKGROUND

On many occasions in a process where a chemical reaction occurs, the surfaces of vessels and containers proximate to the reaction often become layered with a precipitate (e.g., minerals, or chemical compounds) from the reaction. For example, in treatment systems for removing minerals from water, the minerals (also known as "scale") precipitate from the water being treated and adhere to the surfaces of the vessels of the water treatment systems. Precipitation in these and other systems can cause issues with the process, including reduced heat transfer, reduced flow, and/or reduced surface area for promoting the desired reaction. Accordingly, the precipitate needs to be periodically removed, mechanically, chemically, or otherwise, for the process to operate optimally.

Typically, the surface which has the precipitate is prone to the phenomena and will continue having precipitation occur during its operation. An example would be scale in a tube or pipe that, once cleaned, will once again begin building scale upon returning to operation. This problem can incur expensive maintenance and downtime which requires mechanical or chemical removal with some frequency. Attempts to prevent precipitation, either through the use of chemicals, change in flow, or material of surface used may hinder other parts of the process.

Accordingly, mechanisms and methods for removing precipitates from fluid treatment component surfaces which are effective, efficient and require less downtime of the process are desirable.

SUMMARY OF THE INVENTION

In accordance with various non-limiting and exemplary embodiments, the present disclosure comprises devices, systems, and methods for the removal of a precipitate from a surface of a water treatment chamber. For example, in accordance with the present disclosure, a dasher assembly having two cylindrical actuator rods connected to a dasher for scraping an interior surface of a water treatment chamber.

In accordance with various aspects of the present disclosure, the water treatment chamber has an enclosed first end, an enclosed second end, and an electrolysis rod extending linearly within the water treatment chamber. The two cylindrical actuator rods extend linearly within the water treatment chamber and pass through the enclosed first end so that portions of the two cylindrical actuator rods are within the water treatment chamber and portions are outside the water treatment chamber.

In accordance with various aspects of the present disclosure, the dasher includes an aperture therethrough so the electrolysis rod can pass through the aperture and allow the dasher to translate from a first location proximate the enclosed first end a second location proximate the enclosed second end by translation of the two cylindrical actuator rods via a mechanical actuator for translating the dasher assembly linearly within the water treatment chamber.

In accordance with various aspects of the present disclosure, the dasher further comprises teeth extending from an outer edge of the dasher to score the precipitate as the dasher translates from the first location to the second location. In accordance with various aspects of the present disclosure, the dasher assembly is controlled manually and/or by an automated control system.

In accordance with various aspects of the present disclosure, a water treatment chamber inlet and a water treatment chamber outlet are provided. The water treatment chamber outlet opens to allow purging of the precipitate removed from the surface of the water treatment chamber. In some embodiments, a filter mechanism may be included to capture the precipitate removed from the surface of the water treatment chamber.

BRIEF DESCRIPTION OF THE DRAWINGS

The accompanying drawings provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
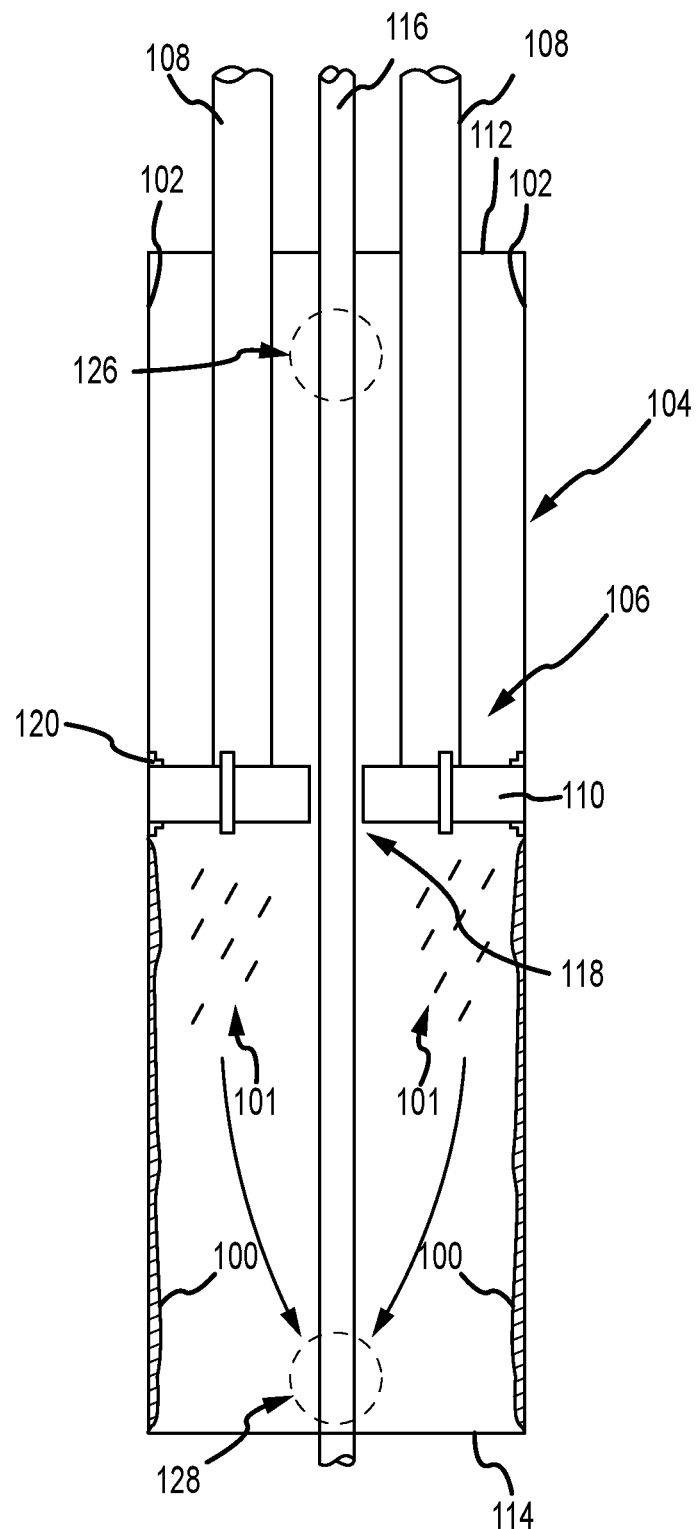
FIG. 1 is a cross-sectional side view of a water treatment chamber with a dasher assembly in accordance with the present disclosure.

Persons skilled in the art will readily appreciate that various aspects of the present invention may be realized by any number of methods and apparatuses configured to perform the intended functions. Stated differently, other methods and apparatuses may be incorporated herein to perform the intended functions. It should also be noted that the accompanying drawing figures referred to herein are not all drawn to scale, but may be exaggerated to illustrate various aspects of the present invention, and in that regard, the drawing figures should not be construed as limiting. Finally, although the present invention may be described in connection with various principles and beliefs, the present invention should not be bound by theory.

The above being noted, in accordance with various aspects of the present disclosure, mechanisms, systems and methods disclosed herein are applicable to the removal of a precipitates in a variety of forms surfaces used in connection with of any number of processes where a chemical reaction occurs, but may find particular use with the descaling of the surfaces of water treatment devices.

For example, various exemplary embodiments of the present disclosure comprise devices, systems and methods may be used with water treatment systems that remove minerals from a fluid such as water by using one or more water treatment chambers that contain the fluid, power supplies, and various control mechanisms. The water treatment chambers comprise a reaction chamber wall having a conductive interior surface and a conductive element typically in the form of an electrolysis rod extending linearly within the water treatment chamber. An electric field is applied to the water within the water treatment chamber such that the conductive surface and the electrolysis rod have opposing charges and separate the water into negative ions and positive ions between the electrolysis rod and the conductive surface, thereby causing the precipitation of the minerals on the interior surface.

As will be described in more detail below, when the interior surface has accumulated enough precipitation to hinder the operation of the water treatment system, mechanisms and systems disclosed herein use a mechanized linear motion to drive a "dasher" that scrapes precipitate from the interior surface. The dasher moves across the surface, applying pressure to the precipitates, thereby removing them. The precipitates, now free from adhesion to the surface, can be purged from the water treatment chamber, allowing it to operate without hinderance from the precipitate.

Figure 2:
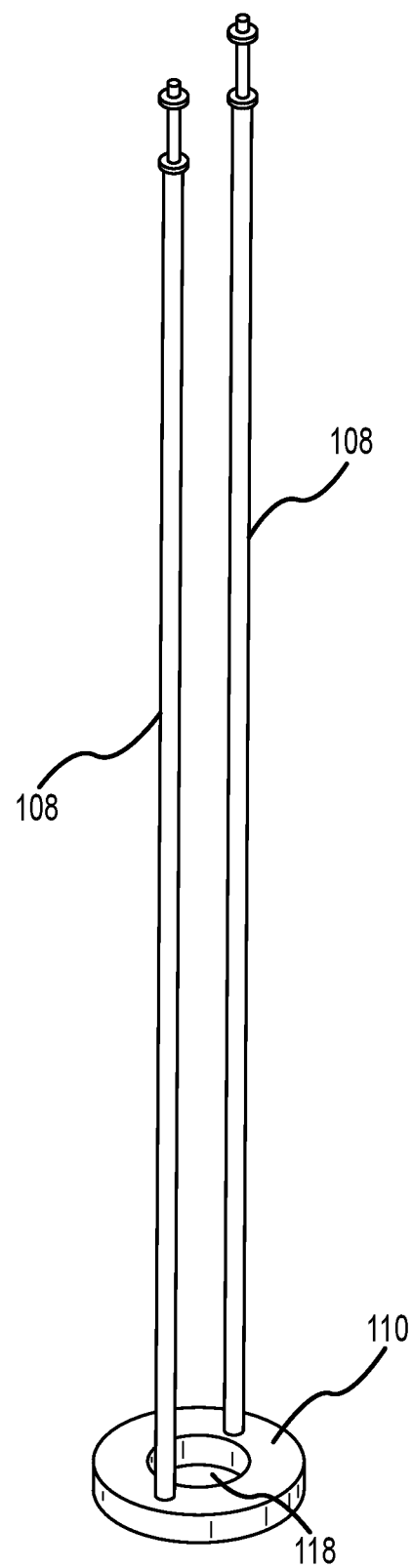
FIG. 2 is a perspective view of a dasher assembly in accordance with the present disclosure.

For example, with reference now to FIGS. 1 and 2, in accordance with various aspects of the present disclosure, a cleaning apparatus for removal of a precipitate 100 from an interior surface 102 of a water treatment chamber 104 comprises a dasher assembly 106 comprising two cylindrical actuator rods 108 connected to a dasher 110 for scraping the interior surface 102 of the water treatment chamber 104. The two cylindrical actuator rods 108 are connected to the dasher 110 by any suitable connection mechanism, such as threaded connections, welding, brazing, press fit and the like.

As illustrated in FIGS. 1-4, the water treatment chamber 104 comprises an enclosed first end 112, an enclosed second end 114, and an electrolysis rod 116 extending linearly within the water treatment chamber 104. The two cylindrical actuator rods 108 extend linearly within the water treatment chamber 104 and pass through the enclosed first end 112 external to the water treatment chamber 104.

With reference now to FIGS. 1, 2, 5 and 6, the dasher 110 comprises an aperture 118 therethrough in a location that allows the electrolysis rod 116 to pass through the aperture 118. In the illustrated embodiment, the aperture 118 is proximate the center of the dasher 110 because the electrolysis rod 116 is proximate the center of the water treatment chamber 104, though the aperture 118 location will vary depending on the location of the electrolysis rod 116 within the water treatment chamber 104. With the aperture 118 properly located in the dasher 110, the dasher 110 can translate linearly along the electrolysis rod 116 from a first location proximate the enclosed first end 112 (upper) and a second location proximate the enclosed second end 114 (lower) by translation of the two cylindrical actuator rods 108.

In accordance with various aspects of the present disclosure, the dasher 110, when moving across the surface 102, applies pressure on the precipitate 100 adhering to the surface 102 by scraping it. Generally, the dasher 110 moves across the surface 102 over a majority of its length and/or width and covers a majority of the surface area of the surface 102.

In accordance with various aspects of the present disclosure, the dasher 110 is comprised of any suitably rigid material capable of scraping the precipitate 100, such as PVC, CPVC, HDPE, carbon steel, PLA, ABS, or the like.

In accordance with various aspects of the present disclosure, the dasher 110 has a dasher profile that is the same as a cross-sectional profile of the water treatment chamber 104 to facilitate a more uniform scraping of the precipitate 100 from the interior surface 102 of the water treatment chamber 104 though the profile may vary depending on additional features of the dasher 110.

For example, in accordance with various aspects of the present disclosure, the dasher 110 may further comprise one or more teeth 120 distributed about the dasher 110. The teeth 120 are any mechanism which help the dasher 110 score the precipitate 100 as the dasher 110 translates from the first location to the second location, providing for easier detachment of the precipitate 100 from the surface 102. In some embodiments, the teeth 120 extend from an outer edge of the dasher 110. In the illustrated embodiment, there are eight teeth 120, though the numbers and configuration of the teeth 120 may vary. In accordance with various aspects of the present disclosure, the teeth 120 are comprised of any suitably rigid material capable of scoring the precipitate 100, such as carbon steel, titanium, or the like.

In accordance with various aspects of the present disclosure, a mechanical actuator (not shown) is used to translate the dasher assembly 106 linearly within the water treatment chamber 104 along its axis by directly or indirectly applying a force on the dasher 110. The mechanical actuator can be any device capable of creating the desired motion of the dasher assembly 106, including, but not limited to, a linear actuator, a rod, a rack and pinion, a crankshaft, a belt drive system or the like, and may be powered by AC, DC, pressurized gas, combustion, or the like. In some embodiments, the dasher 110 may partially or fully rotate within the water treatment chamber 104 as it translates linearly.

Figure 3B:
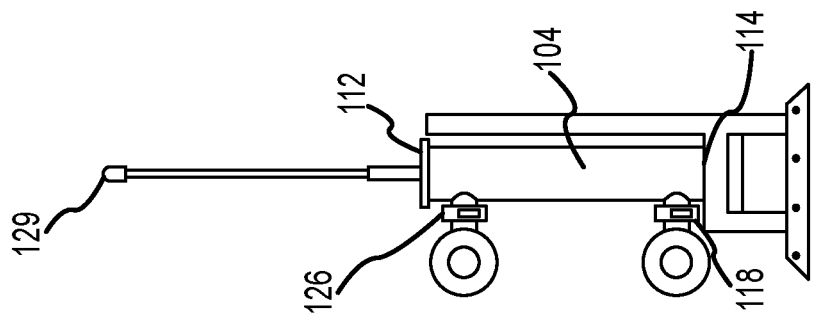
FIG. 3B is a side view of the multiple water treatment chambers with independent dasher assemblies of FIG. 3A in accordance with the present disclosure.
Figure 3A:
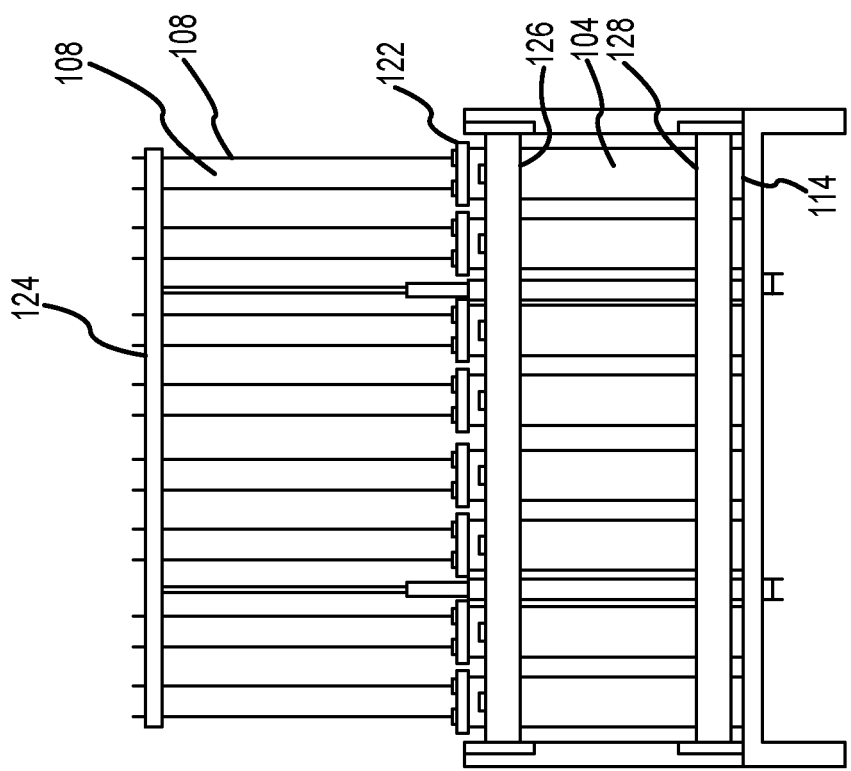
FIG. 3A is a front view of multiple water treatment chambers with independent dasher assemblies in accordance with the present disclosure.
Figure 4:
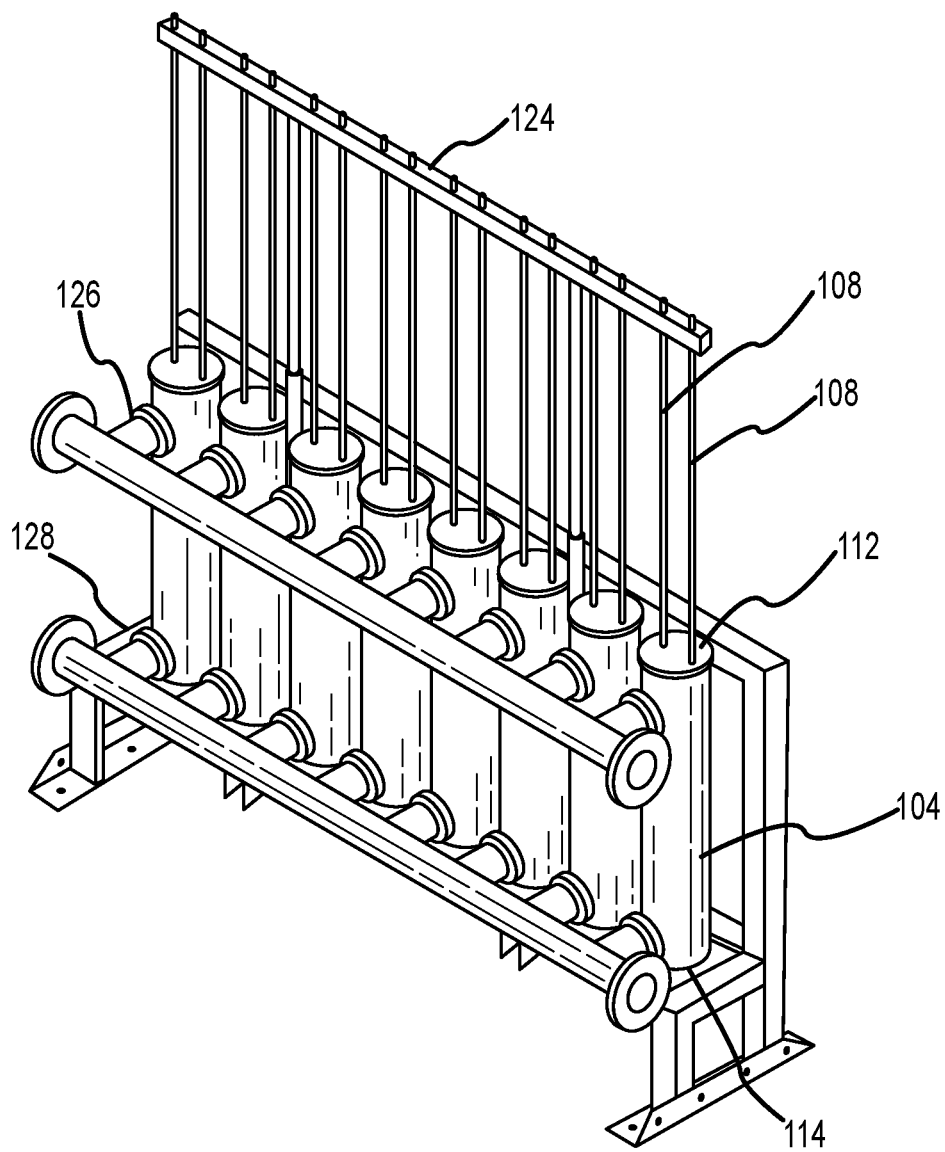
FIG. 4 is a perspective view of the multiple water treatment chambers with independent dasher assemblies of FIGS. 3A and 3B in accordance with the present disclosure.
Figure 5:
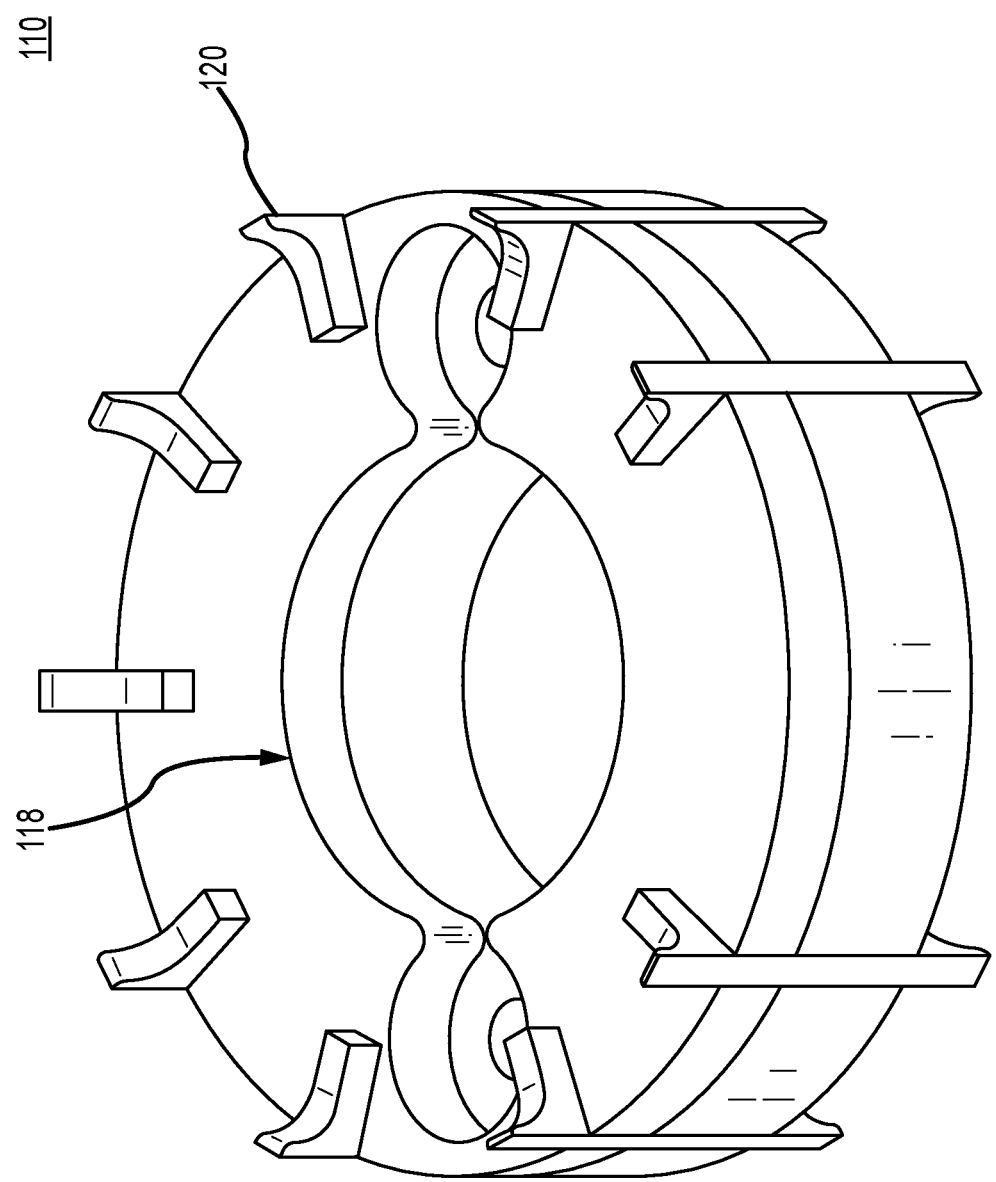
FIG. 5 is a top perspective view of a dasher in accordance with the present disclosure.
Figure 6:
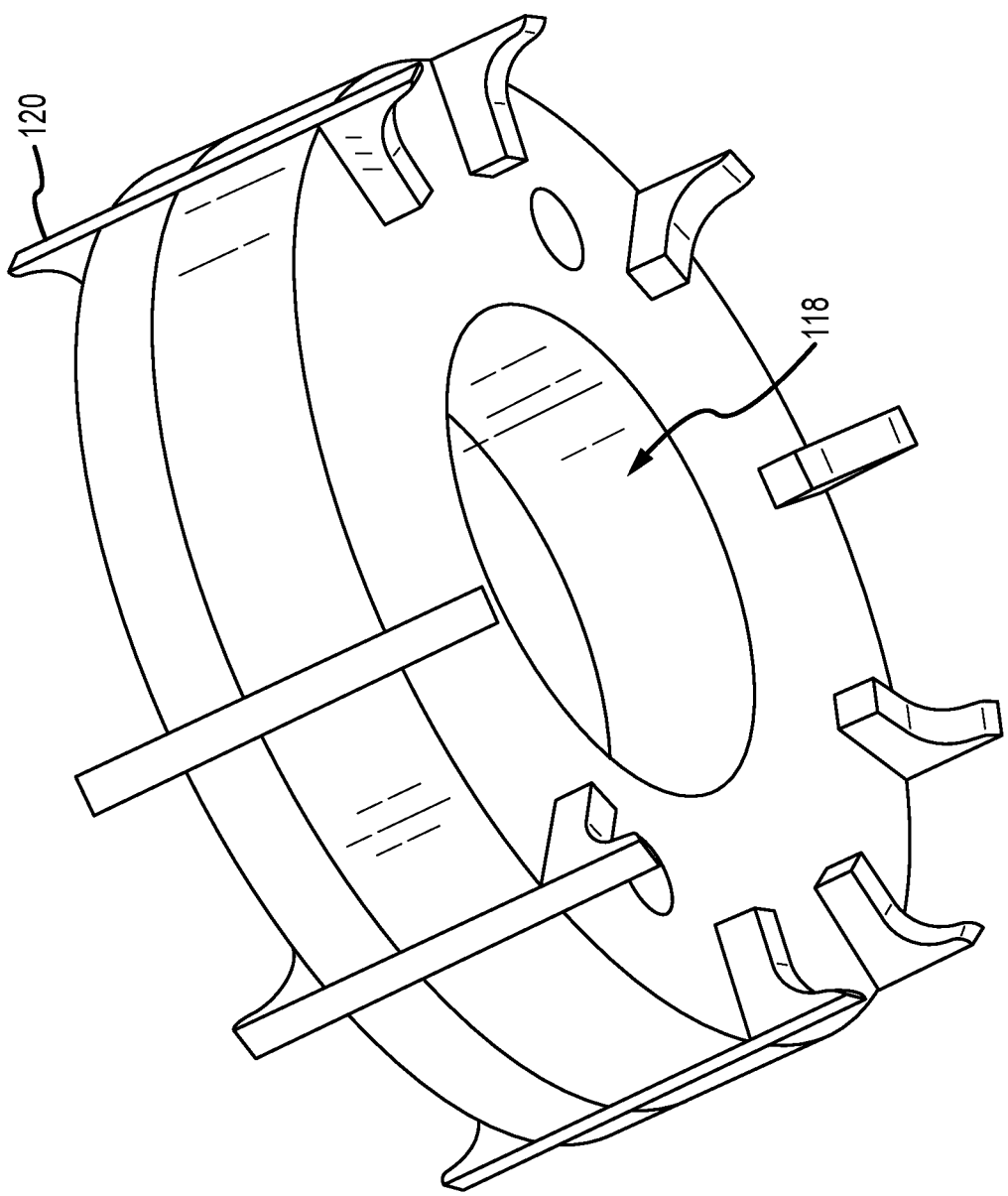
FIG. 6 is a side and bottom perspective view of the dasher of FIG. 5 in accordance with the present disclosure.

In accordance with various aspects of the present disclosure and with reference to FIGS. 3-4, in systems having multiple water treatment chambers 104, each of the multiple water treatment chambers 104 may have its own independent dasher assembly 106. In some embodiments having multiple water treatment chambers 104 and as illustrated in FIGS. 3-4, a beam 124 connecting the each set of cylindrical actuator rods 108 of each independent dasher assembly 106 to the mechanical actuator may be used to indirectly apply a force to the dasher assemblies 106. In such configurations, only one mechanical actuator is needed to drive all the dasher assemblies 106 together by moving the beam 124.

Alternatively, in other embodiments having multiple water treatment chambers 104, each of the sets of cylindrical actuator rods 108 of each independent dasher assembly 106 may be driven by independent mechanical actuators. In some embodiments, the independent mechanical actuators are synchronized, while in others, some or all may be asynchronous. In accordance with various aspects of the present disclosure, the independent mechanical actuators can be synchronized using position sensors, such as ultrasonics, lasers, and pulse signals generated by the individual actuators.

In accordance with various aspects of the present disclosure, the dasher assembly 106 may be controlled by a switch that reverses a direction of current flow into the mechanical actuator thereby reversing the travel direction of the dasher assembly 106.

In accordance with various aspects of the present disclosure, the dasher assembly 106 may be controlled manually by an operator, by an automated control system, or by a combination of the same. The control can be over various aspects of the operation including frequency, speed, cycles, travel (distance), rotation or the like. For example, the system can be pre-programmed to operate at set intervals, such as predetermined periods ranging from 24-hour cycles to 168-hour cycles, including, preferably, 48-hour cycles. Still other cycles may likewise be used and likewise fall within the scope of the present disclosure.

In accordance with various aspects of the present disclosure, the automated control system may be a dedicated programmable logic circuit (PLC) or via desktop software that activates and controls the dasher assembly 106 at predetermined periods. Alternatively, the automated control system may be web or cloud based and remotely activated using wireless, RF, cellular, LAN, or WAN internet connectivity or other distributed connectivity.

In accordance with various aspects of the present disclosure and with reference to FIGS. 3-4, the water treatment chamber 104 includes a water treatment chamber inlet 126 and a water treatment chamber outlet 128. During operation, the dasher assembly 106 (and dasher 110) translates between the water treatment chamber inlet 126 and the water treatment chamber outlet 128, removing precipitate 100 adhered to the surface 102 therebetween. When not in operation, the dasher 110 remains in the water treatment chamber 104 above the water treatment chamber inlet 126 so as not to obstruct the flow of fluid within the water treatment chamber 104. In addition to no obstructing the flow, such positioning also allows quick operation of the dasher assembly 106 as it is already in position to begin use.

In accordance with various aspects of the present disclosure, the water treatment chamber outlet 128 includes a valve that opens to allow the purging of removed precipitate 101 scraped or otherwise removed from the surface 102 of the water treatment chamber 104. In some embodiments, a conventional filter mechanism is provided to capture the removed precipitate 101 scraped from the surface 102 of the water treatment chamber 104. Non-limiting examples of such filter mechanisms include filter baskets, mesh filters, and bag filters.

In accordance with various aspects of the present disclosure, the water treatment chamber 104 need not be fully enclosed as is the case for a cylinder or pipe. Rather, in some embodiments, the water treatment chamber 104 has a partially enclosed perimeter such as a quarter, third or half pipe configuration. Additionally, the profile of the water treatment chamber 104 and/or dasher 110 need not be curved, but encompass other geometric profiles, with straight lines, angles, and combinations of the same.

It will be apparent to those skilled in the art that various modifications and variations can be made in the present invention without departing from the spirit or scope of the invention. For example, numerous materials, shapes, sizes, and configurations can be substituted in place of those described herein. Thus, the present invention covers the modifications and variations of this invention provided they come within the scope of the appended claims and their equivalents.

We claim:

1. A system for removal of precipitate comprising:
a cleaning apparatus;
at least one water treatment chamber;
the cleaning apparatus comprising:
a dasher assembly comprising two cylindrical actuator rods connected to a dasher for scraping an interior surface of the water treatment chamber, wherein:
the water treatment chamber comprises an enclosed first end, an enclosed second end, and an electrolysis rod extending linearly within the water treatment chamber;
wherein the two cylindrical actuator rods extending linearly within the water treatment chamber and passthrough the enclosed first end; and the dasher comprising an aperture therethrough,
wherein the electrolysis rod passes through the aperture, and wherein the dasher is configured to translate from a first location proximate the enclosed first end a second location proximate the enclosed second end by translation of the two cylindrical actuator rods;
and a water treatment chamber inlet and a water treatment chamber outlet; and a mechanical actuator for translating the dasher assembly linearly within the water treatment chamber.

2. The system of claim 1, wherein the dasher comprises a dasher profile that is the same as a cross-sectional profile of the water treatment chamber.

3. The system of claim 2, wherein the dasher further comprises teeth extending from an outer edge of the dasher to score the precipitate as the dasher translates from the first location to the second location.

4. The system of claim 1, further comprising multiple water treatment chambers, each of the multiple water treatment chambers having an independent dasher assembly.

5. The system of claim 4, further comprising a beam connecting the two cylindrical actuator rods of each independent dasher assembly to the mechanical actuator.

6. The system of claim 4, wherein each of the two cylindrical actuator rods of each independent dasher assembly are driven by independent mechanical actuators.

7. The system of claim 6, wherein the independent mechanical actuators are synchronized.

8. The system of claim 1, wherein the mechanical actuator comprises at least one of a linear actuator, a rod, a rack and pinion, a crankshaft, and a belt drive system.

9. The system of claim 1, wherein the dasher assembly is controlled by an automated control system.

10. The system of claim 9, wherein the automated control system is a dedicated programmable logic circuit (PLC) that activates at predetermined periods.

11. The system of claim 10, wherein the predetermined periods range from 24-hour cycles to 168-hour cycles.

12. The system of claim 11, wherein the predetermined periods are 48-hour cycles.

13. The system of claim 9, wherein the automated control system is remotely activated using internet connectivity.

14. The system of claim 1, wherein the dasher assembly is controlled by a switch that reverses a direction of current flow into the mechanical actuator.

15. The system of claim 1, wherein during operation, the dasher translates between the water treatment chamber inlet and the water treatment chamber outlet.

16. The system of claim 15, wherein when not in operation, the dasher remains in the water treatment chamber above the water treatment chamber inlet.

17. The system of claim 1, wherein the water treatment chamber outlet opens to allow purging of the precipitate removed from the surface of the water treatment chamber.

18. The system of claim 17, further comprising a filter mechanism to capture the precipitate removed from the surface of the water treatment chamber.

19. The system of claim 18, wherein the filter mechanism is at least one of a filter basket, a mesh filter, and a bag filter.

20. The system of claim 1, wherein the water treatment chamber has a partially enclosed perimeter.

* * * * *